UNITED STATES PATENT OFFICE.

ALEXR. H. EVERETT, OF NEW YORK, N. Y.

IMPROVED PROCESS OF REFINING AND SOFTENING LEAD.

Specification forming part of Letters Patent No. 42,844, dated May 24, 1864.

*To all whom it may concern:*

Be it known that I, ALEXANDER H. EVERETT, of the city, county, and State of New York, have invented a new and useful improvement in refining and softening lead containing the metals that are usually present when it is reduced from the native ores; and I do hereby declare that the following is a clear and exact description thereof.

I desire to remark, before describing my improvement, that the process now generally practiced for the purpose to which my improved mode relates consists in fusing the lead to be refined in a reverberatory furnace of the same construction as that in which it was reduced from the ore, with the exception of having a cast-iron bed, and allowing it to remain exposed to the oxidizing influence of the heated air of the furnace until the metals constituting the impurities become oxidized, and therefore float on the surface of the melted metal, when this "dross" is raked off with a iron rake, and that the duration of time required to complete this process depends upon the nature and amount of foreign metals present in the lead. The shortest time, however, under the most favorable circumstances, is not less than twelve hours, while in some instances several days are necessary. A considerable loss of lead occurs from oxidation in the practice of this process.

To lessen the time required by the older processes, and therefore the expense of fuel, labor, a greater cost for building furnaces and other attendant provisions to refine large quantities of metal, as well as to reduce the loss from oxidation of lead, are the objects of my invention.

The nature of my improvement consists in the use of metallic sulphurets or sulphur in mechanical combination with organic products in a reverberatory furnace, for the purpose of effecting the separation of copper, zinc, antimony, iron, and other metals which it is the object of the refiner to remove from lead to make it of prime quality.

In order to enable others to practice my improvement, I will now describe the process.

The furnace provided may be the ordinary reverberatory furnace for reducing lead ores, except, in place of the fire-brick or tiles forming the bed, hard cast-iron must be employed. Into this furnace the unrefined lead to be operated upon is placed, the doors of the reverberatory furnace are closed, and the walls heated to a red heat. When the metal will have been melted the doors are reopened and sulphuret of lead or other metallic sulphuret or sulphur itself, finely pulverized and mixed with hydrocarbon, is evenly spread over the surface of the melted metal. The sulphur immediately unites with the metallic impurities and forms sulphurets, which float on the surface of the lead and are easily withdrawn by an iron rake or hoe. When these conditions have been complied with the tap provided at the side of the reverberatory is drawn and the refined lead recast into ingots.

I have not designated the proportions of sulphur to the hydrocarbon, nor the quantity of the compound to be employed for refining a given quantity of lead. The former will depend upon the source from which it has been obtained and the physical nature of the hydrocarbon, and the latter upon the quantity of foreign metals to be removed. Generally one part of sulphur to five of hydrocarbon, by weight, will be found to answer, and one hundred pounds of this mixture will be sufficient to refine two thousand pounds of lead. Charcoal, when convenient, may be used; but I prefer the use of anthracite siftings or coal-dust obtained at the coal-yards, on account of their cheapness.

The time ordinarily required for performing an operation is one hour.

Having thus described my invention, I claim—

1. The method herein described of refining and softening lead by the employment, in reverberatory furnaces and in combination with the melted lead, of sulphur or metallic sulphurets, in the manner and for the purpose set forth.

2. The method herein described of refining and softening lead by the employment of hydrocarbon, in combination with sulphur, in the manner set forth, and for the purpose of preventing the oxidation of the lead.

In testimony whereof I have signed my name to this specification before two subscribing witnesses.

A. H. EVERETT.

Witnesses:
   HENRY CAMP,
   CHARLES NETTLETON.